United States Patent
Bisson et al.

(10) Patent No.: US 11,055,253 B2
(45) Date of Patent: Jul. 6, 2021

(54) METHOD TO INCREASE THE BANDWIDTH OF A USB-C CONNECTOR

(71) Applicant: Nvidia Corporation, Santa Clara, CA (US)

(72) Inventors: Luc Bisson, Santa Clara, CA (US); Rambod Jacoby, Santa Clara, CA (US); Mark Overby, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 16/652,642

(22) PCT Filed: Oct. 17, 2018

(86) PCT No.: PCT/US2018/056345
§ 371 (c)(1),
(2) Date: Mar. 31, 2020

(87) PCT Pub. No.: WO2019/079495
PCT Pub. Date: Apr. 25, 2019

(65) Prior Publication Data
US 2020/0242070 A1 Jul. 30, 2020

Related U.S. Application Data

(60) Provisional application No. 62/574,080, filed on Oct. 18, 2017.

(51) Int. Cl.
*G06F 13/42* (2006.01)
(52) U.S. Cl.
CPC .. *G06F 13/4282* (2013.01); *G06F 2213/0042* (2013.01)

(58) Field of Classification Search
CPC ......... G06F 13/4282; G06F 2213/0042; G06F 13/38
See application file for complete search history.

(56) References Cited

U.S. PATENT DOCUMENTS

| 10,311,000 B2* | 6/2019 | Tan .................. G06F 13/405 |
| 10,416,717 B2* | 9/2019 | Jeansonne ........... G06F 13/38 |

(Continued)

FOREIGN PATENT DOCUMENTS

| WO | 2016112152 A1 | 7/2016 |
| WO | 2019079495 A1 | 4/2019 |

OTHER PUBLICATIONS

Vesa, 2014 VESA DisplayPort Alt Mode.*

*Primary Examiner* — Henry Tsai
*Assistant Examiner* — Christopher A Daley

(57) ABSTRACT

This disclosure provides a method that allows connector pins of a USB-C connector to be dynamically repurposed between low bandwidth USB2 traffic and high bandwidth USB3 traffic. USB-C devices can negotiate the use of these pins for a dynamic transition to another function or functions. The pins can be the four center connector pins of a USB-C connection, pins A6, A7, B6, B7, that are originally designated as USB 2.0 differential pairs Changing the function of the pins provides flexibility for communicating using USB-C connectors. For example, the disclosed method/device/system can be used to support high-resolution cameras and sensors in high-resolution virtual reality headsets via a single USB-C connection instead of a user having to connect multiple cables.

18 Claims, 3 Drawing Sheets

(56) References Cited

U.S. PATENT DOCUMENTS

| | | | |
|---|---|---|---|
| 2013/0304942 A1* | 11/2013 | Golembeski | G06F 13/385 |
| | | | 710/14 |
| 2016/0378704 A1* | 12/2016 | Adamson | G06F 13/385 |
| | | | 710/104 |
| 2017/0109312 A1* | 4/2017 | Voor | G06F 13/4022 |
| 2017/0110835 A1 | 4/2017 | Hasegawa et al. | |
| 2020/0226087 A1* | 7/2020 | Sun | H04N 21/44227 |

* cited by examiner

METHOD TO INCREASE THE BANDWIDTH OF A USB-C CONNECTOR

CROSS-REFERENCE TO RELATED APPLICATION

This application is the National Stage of, and therefore claims the benefit of, International Application No. PCT/US2018/056345 filed on Oct. 17, 2018, entitled "METHOD TO INCREASE THE BANDWIDTH OF A USB-C CONNECTOR," which claims the benefit of U.S. Provisional Application Ser. No. 62/574,080, filed by Luc Bisson, et al. on Oct. 18, 2017, entitled "METHOD TO INCREASE THE BANDWIDTH OF A USB-C CONNECTOR." The above applications are commonly assigned with this National Stage application and are incorporated herein by reference in their entirety.

TECHNICAL FIELD

This application is directed, in general, to USB connectors, and, more specifically, to USB-C connector systems.

BACKGROUND

Universal Serial Bus (USB) is an industry standard for communicating and supplying power between host computing devices and their peripheral devices. The USB standard covers the cables, the connectors, and the protocols that are used for the communicating and supplying of power. USB-C is an example of a USB standard connector system having 24-pins that are defined for communications, power, and control according to the USB Implementers Forum (USB-IF). The standard USB-C receptacle has four power pins, four ground pins, four shielded differential pairs for high speed traffic (USB 3.1), two differential pairs for USB data (USB-2.0), two Sideband Use (SBU) pins, and two Configuration Channel (CC) pins.

SUMMARY

In one aspect, disclosure provides a USB interface. In one embodiment the USB interface includes: (1) a USB-C connector having pins configured for data communication, and (2) a pin controller configured to repurpose center connector pins of the USB-C connector pins for the data communication.

In another aspect, the disclosure provides a method of repurposing pins of a USB-C connector. In one embodiment the method includes: (1) negotiating signaling between a USB computing device and a USB connected device via USB-C connectors, (2) dynamically determining an alternate mode for repurposing center connector pins of the USB-C connectors is supported by both the USB computing device and the USB connected device, and (3) activating the alternate mode for communication between the USB computing device and the USB connected device.

In yet another aspect, the disclosure provides a computing device. In one embodiment the computing device includes: (1) a processor, and (2) a USB interface communicatively coupled to the processor, wherein the USB interface includes a USB-C connector having pins configured to communicate data between the processor and a connected device, and a pin controller configured to repurpose center connector pins of the USB-C connector pins for communicating the data to the connected device.

BRIEF DESCRIPTION OF DRAWINGS

Reference is now made to the following descriptions taken in conjunction with the accompanying drawings, in which.

DETAILED DESCRIPTION

Communication over the pins of a USB-C connector as defined by the USB-IF can limit the desired bandwidth of a USB-C connector for certain functions. For example, the definition of a USB-C connector does not allow for USB3 signaling and four lanes of DisplayPort signaling to happen simultaneously. Accordingly, using a USB-C connector in some applications, such as with Virtual Reality (VR) devices, can be limited. In response, some companies have tried to increase the bandwidth of USB-C for applications such as VR through brute force tactics of implementing two or more USB-C connectors for such applications.

To increase the bandwidth of a USB Type C connector, i.e., a USB-C connector, for desired functions, this disclosure provides a method that allows connector pins of the USB-C connector to be dynamically repurposed between low bandwidth USB2 traffic and high bandwidth USB3 traffic. Thus, connector pins that have been originally designated for low bandwidth USB2 traffic by the USB-IF can be dynamically re-purposed. A USB-C host and peripheral can negotiate the use of these pins for a dynamic transition to another function or functions. The negotiating for repurposing can be via vendor-defined messages (VDM) over the configuration channel of the USB-C connection. The pins can be the four center pins of a USB-C connection, pins A6, A7, B6, B7, that are originally designated as USB 2.0 differential pairs by the USB-IF.

The disclosed method/device/system is advantageous in providing flexibility for communicating using USB-C connectors. For example, the disclosed method/device/system can be used to enable high-resolution VR headsets that are often used, for example, in VR systems having high-powered graphics processors. In such applications, the pins designated for USB2 differential pairs are dynamically repurposed for high-speed USB3 traffic. The USB-C connection can be used to simultaneously deliver four high-speed DisplayPort lanes and a USB3 data channel for supporting high-resolution cameras and sensors. VR headsets can then employ a single USB-C connection that delivers increased display resolution and incorporates high-bandwidth cameras for tracking and Augmented Reality (AR).

Accordingly, instead of using proprietary adapters, such as dongles, with both HDMI and USB inputs and proprietary cable from the adapter to the HMD, a single USB-C connection as disclosed herein can be used. This permits using a single low profile, USB-C connector on computing devices instead of requiring both a USB port and HDMI port. By, for example, doubling the DisplayPort bandwidth when simultaneously using USB3 through the use of a single USB-C connector, the additional cost of a second connector and the additional physical space required for additional ports can be eliminated.

Figure 1:
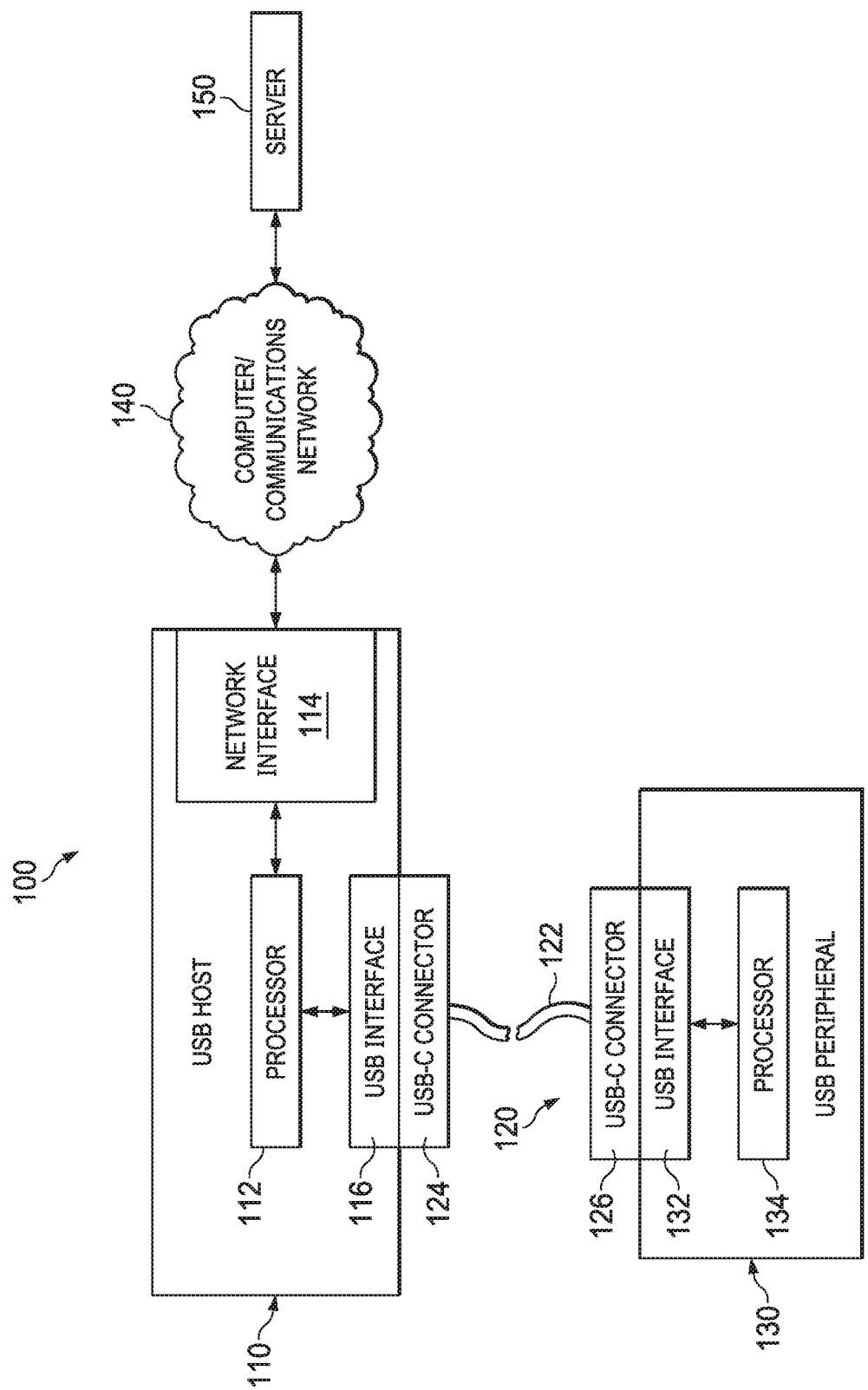
FIG. 1 illustrates a diagram of an embodiment of a computer system that employs a USB-C connector system constructed according to the principles of the disclosure.

Turning to the Figures, FIG. 1 illustrates a diagram of an embodiment of a computer system 100 that employs a USB-C connector system constructed according to the principles of the disclosure. The computer system 100 employs remapping of USB-C connector pins to an alternate function. The computer system 100 includes a USB host 110, a USB peripheral 130, a USB-C connector system 120, a communications network 140, and a server 150.

The USB host 110 is a computing device that can be a general purpose computing device or a computing device that is directed to a specific purpose. For example, the USB host 110 can be a personal computer (PC), a laptop, a smart phone, a computing pad, or a dedicated game device. The USB host 110 includes a processor 112, a network interface 114, and a USB interface 116. The USB host 110 can include additional components that are typically included in a computing device, such as a memory or storage for retaining digital data and busses for connecting the various components.

The processor 112 is configured to receive data, process data, and provide an appropriate output. The processor 112 can be, for example, a conventional processor or processors, such as central processing units (CPUs), graphics processing units (GPUs), or a combination of both. The network interface 114 is configured to communicate data between the processor 112 and the communications network 140. The network interface 114 can also be a conventional component.

The USB interface 116 is communicatively coupled to the processor 112 and is configured to communicate data between the USB host 110 and connected devices, such as the USB peripheral 130. The USB interface 116 is configured to support dynamically repurposing USB connector pins. The USB connector pins can be USB-C connector pins A6, A7, B6, B7, which are collectively referred to herein as the center connector pins and used hereinafter in examples. The center connector pins are originally designated for low bandwidth USB2 traffic by the USB-IF. The USB interface 116 is a USB-C interface that is configured to change a function of USB-C pins to another function. The USB interface 116 includes a USB-C connector (not shown) that is a receptacle or plug. The USB host 110 is coupled to the USB peripheral 130 via the USB-C connector system 120.

The USB-C connector system 120 includes a USB-C cable 122 that connects a first USB-C connector 124 to a second USB-C connector 126. The first USB-C connector 124 is connected to the USB interface 116 and the second USB-C connector 126 is connected to USB interface 132 of the USB peripheral. The first USB-C connector 124 and the second USB-C connector 126 can be receptacles or plugs depending on the corresponding USB connectors of the USB interface 116 and the USB interface 132. Each component of the USB-C connector system 120 can be a standard USB-C component.

The USB peripheral 130 is a computing device that interacts with the USB host 110. The USB peripheral 130 can be, for example, a head-mounted display (HMD), another type of display, a docking station, or storage drives. The USB peripheral 130 can be a HMD employed for VR or AR applications. Thus, the USB-C connector system 120 can be a single connector that allows plugging a VR HMD onto a platform that can deliver high fidelity video to the HMD and allow an upstream link to a host device to receive data from cameras, sensors, accelerometers, etc., that are used to deliver a good VR experience. HMD manufacturers can benefit from this bundling of functions into a single USB-C connection by removing the need of an adapter, removing the uncertainty of capabilities when plugging end, reducing costs by only needing a single interface with a connected device (e.g., a host device), and improving the data communication capability over existing systems.

The USB peripheral 130 includes the USB interface 132 and a processor 134. The USB peripheral 130 can include additional components that are typically included in a computing device, such as a memory or storage for retaining digital data and busses for connecting the various components, as noted above for the USB host 110.

The USB host 110 is communicatively coupled to the server 150 via the communications network 140. Both the communications network 140 and the server 150 can be conventional systems. The server 150 can be a GPU based server. The server 150 can be a game server, e.g., a cloud game server. As such, the computer system 100 can be a cloud gaming system and the USB peripheral 130 can be a HMD having a single interface connection to the USB host 110.

Figure 2:
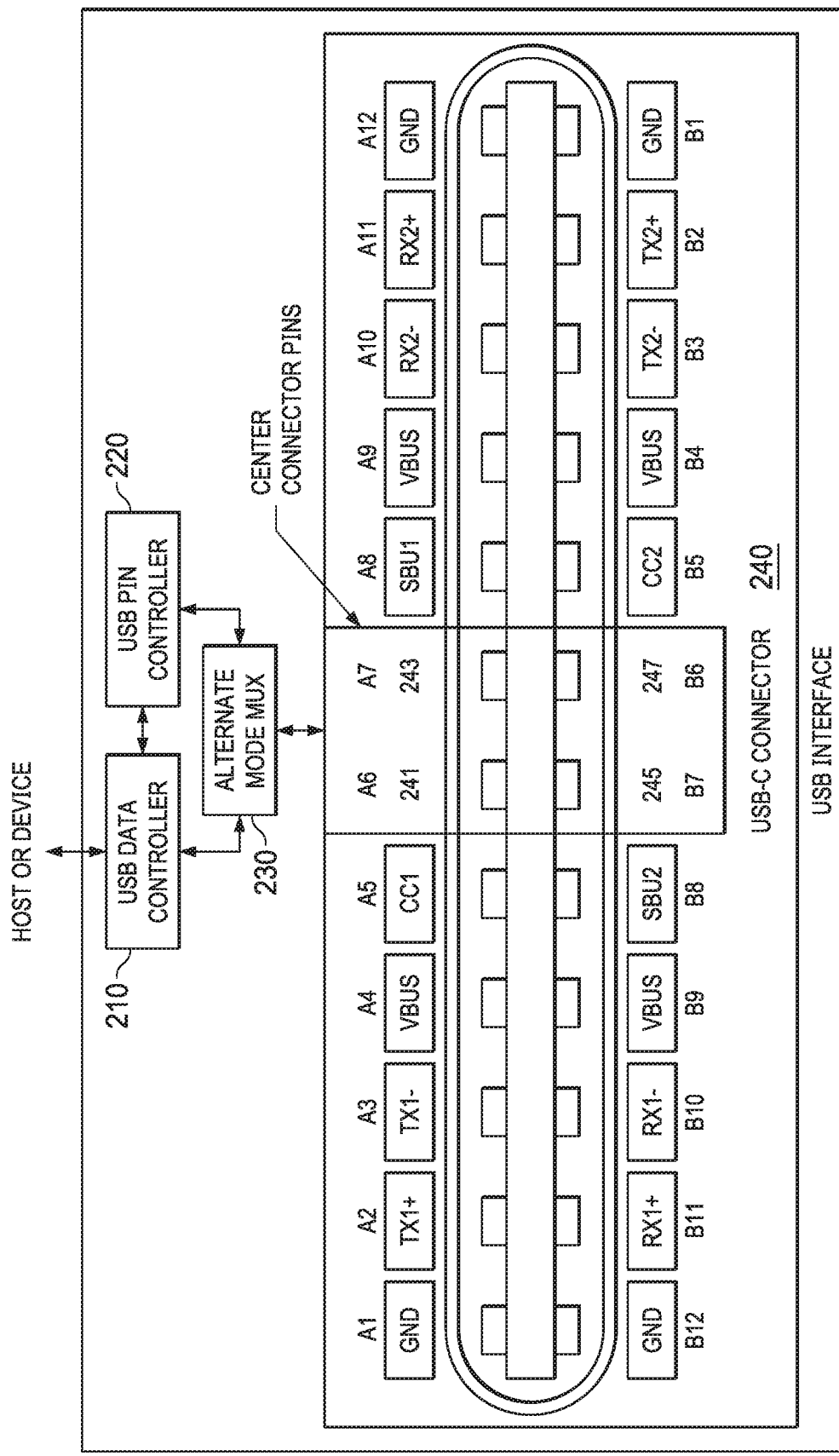
FIG. 2 illustrates a block diagram of an embodiment of a USB interface constructed according to the principles of the disclosure.

FIG. 2 illustrates a block diagram of an embodiment of a USB interface 200 constructed according to the principles of the disclosure. The USB interface 200 can be the USB interface 116 or 132 of FIG. 1. The USB interface 200 includes a USB data controller 210, a pin controller 220, an alternate mode multiplexer 230, and a USB-C connector 240.

The USB data controller 210 is configured to coordinate communication of data for data communication over the USB-C connector 240. The USB data controller 210 controls delivery of data from a host or peripheral device to pins of the USB-C connector 240 via the alternate mode multiplexer 230.

The pin controller 220 is configured to repurpose pins of the USB-C connector 240 for the data communication. The repurposed pins are, for example, the center connector pins of the USB-C connector 240 that are originally designated for USB-2 signaling. In some examples, the pin controller 220 can repurpose one to four of center connector pins to another function. In one embodiment, the pin controller 220 is configured to repurpose the center connector pins to USB-3 signaling.

The pin controller 220 is configured to perform power and alternate mode negotiations. Via the negotiations, the pin controller 220 can repurpose the center connector pins employing a unique ID that indicates a different function than the original designated function for the center connector pins. The pin controller 220 is an independent block from the USB data controller 210. The pin controller 220 can be implemented via multiple configurations. The pin controller 220 can be an independent device, embedded in a platform as an embedded controller, such as on a mobile computing device, or integrated in a USB controller associated with a USB host or peripheral.

The pin controller 220 can be a policy port controller of a USB-C interface, such as a policy port controller at a downstream facing port (such as at USB interface 116) and on an upstream facing port (such as at USB interface 132). In contrast to a typical policy port controller, the pin controller 220 includes logic that repurposes the center connector pins, at least one unique ID corresponding to repurposing of the center connector pins, and additional controls to direct operation of the alternate mode multiplexer 230 for the repurposing of the center connector pins. In some embodiments, the logic can be installed during manufacturing or updated in the field.

The alternate mode multiplexer 230 is controlled by the pin controller 220 for repurposing the center connector pins by connecting the repurposed pins to the inputs. The alternate mode multiplexer 230 can be a conventional multiplexer that can be dynamically controlled to reconfigure connections for delivery on data from the USB data controller 210 to pins of the USB-C connector 240.

The USB-C connector 240 is a physical port having 24 pins configured for data communication and power delivery. In FIG. 2, the USB-C connector 240 is a receptacle. In other embodiments, the USB-C connector 240 can be a plug. The USB-C connector 240 includes four center connector pins 241, 243, 245, and 247, that are repurposed via the pin controller 220 and the alternate mode multiplexer 230 as described herein. The four pins 241, 243, 245, and 247, originally designated as a differential pair for USB-2.0 signaling by the USB-IF. The USB-C connector 240 provides a physical connection to a corresponding USB-C connector of, for example, a UCB-C connection system.

Figure 3:
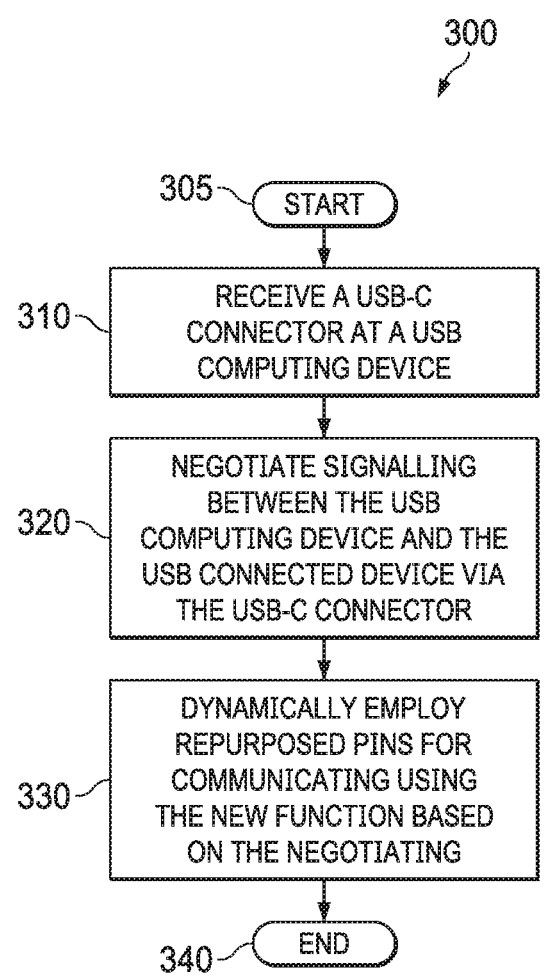
FIG. 3 illustrates a flow diagram of an embodiment of a method of communicating employing a USB-C connector and carried out according to the principles disclosed herein.

FIG. 3 illustrates a flow diagram of an embodiment of a method 300 of communicating employing a USB-C connector and carried out according to the principles disclosed herein. The method 300 or portions thereof can be implemented via hardware, software, or a combination thereof. The logic used to perform the method 300, or at least a part thereof, can be implemented in various locations including USB-C connectors, USB interfaces, a USB host, and/or a USB peripheral. At least a portion of the logic can be implemented in a USB pin controller such as pin controller 220 in FIG. 2. The method 300 begins in a step 305.

In a step 310, a USB-C connector is received at a USB computing device. The USB-C connector is part of a USB-C connector system having a USB-C cable and a USB-C connector at each end of the USB-C cable. USB-C connector system 120 in FIG. 1 is an example. Upon receipt of the USB-C connector, a communication link is established between the USB computing device and a USB-C connected device that is already connected to the other USB-C connector of the USB-C connector system. The USB computing device can be a USB host or a USB peripheral. In one embodiment, the USB computing device is a USB host, such as USB host 110, and the USB connected device is a USB peripheral, such as USB peripheral 130.

In a step 320, the USB computing device and the USB connected device negotiate signaling therebetween via the USB-C connector. The negotiating includes determining if both the USB computing device and the USB connected device support repurposing pins of the USB-C connector for a different function. The repurposing can change the four center connector pins that are originally designated for low bandwidth USB2 traffic to another function. The other function can be for high-speed USB3 traffic. The negotiating and potential re-purposing can involve all four of the center connector pins.

The negotiating of step 320 can be via a standard negotiation communication protocol for a USB-C connection over a configuration channel pin. The negotiating can be initiated when the USB-C connector is received in step 310. Negotiations of power delivery between the USB computing device and the USB connected device can occur first followed by the negotiations of features that include alternate modes. The USB computing device can advertise all supported alternate modes and the USB connected device can examine the advertised alternate modes, determine which one to select, and respond with a message that causes a desired alternate mode to be selected and USB-C connector pins to be remapped.

For example, after negotiating power, "discover modes commands" can be sent by a downstream facing port to an upstream facing port of the USB-C connection. The "discover modes commands" include at least one alternate mode for repurposing pins of the USB-C connector. The upstream facing port responds with a list that includes an alternate mode for repurposing the pins that it supports. The downstream facing port receives the list, selects the alternate mode for repurposing the pins, an sends an "enter mode command" which results in the USB computing device and connected device both entering the alternate mode for repurposing the pins.

The "discover modes commands" include a unique ID that corresponds to the alternate mode for repurposing of the pins, such as the center connector pins. Multiple alternate modes, each having a unique ID, can be established for repurposing of the pins' functions. For example, one alternate mode changes the center connector pins to USB 3 signaling and another alternate mode can change the center connector pins to another function, such as for universal asynchronous receiver-transmitter (UART) signaling. Different alternate modes can also be used wherein the center connector pins are changed to the same function but combined with different re-mappings of other pins of the USB-C connector. In some examples, each of these other pins, unlike the center connector pins, are originally recognized as pins that can be remapped to alternate data protocols by the USB-IF. Examples of the other pins recognized for remapping include the four outer high-speed lanes and the two side-band pins. Thus, continuing the above example, the four center connector pins can be mapped to UART and the outer pins of the USB-C connecter can be mapped to USB signaling to provide a flatform debug channel and USB functionality on the same USB-C connection. Repurposing of the center connector pins can be mixed and matched with different combinations of remapping of the other pins, wherein each of the different combinations would have a unique ID.

In a step 330, the repurposed pins are dynamically employed with a new function between the USB computing device and the USB connected device based on the negotiating. For example, the negotiating may reveal that both the USB computing device and the USB connected device support an alternate mode that employs more pins of the USB-C connectors for USB3 signaling. In some embodiments, all four of the center connector pins are repurposed for USB3 signaling. In one embodiment such as with the VR headset as the device, the DisplayPort bandwidth can be doubled when dynamically re-purposing the four center connector pins for USB3 signaling.

The method 300 ends in a step 340. The function or signaling that is changed on the pins via the method 300 is transparent to the USB computing device and connected device. The changed functions, such as high speed USB3 signaling, still proceed as designed but on different pins of the USB-C connector.

The above-described system, apparatus, and methods or at least a portion thereof may be embodied in or performed by various processors, such as digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods or functions of the system or apparatus described herein.

Certain embodiments disclosed herein can further relate to computer storage products with a non-transitory computer-readable medium that have program code thereon for performing various computer-implemented operations that embody the apparatuses, the systems or carry out the steps of the methods set forth herein. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. A Universal Serial Bus (USB) interface, comprising:
a USB-C connector having pins configured for data communication, wherein the USB-C connector pins include center connector pins that are originally designated for USB-2 signaling; and
a pin controller configured to repurpose four of the center connector pins originally designated for USB-2 signaling to USB-3 signaling.

2. The USB interface as recited in claim 1 wherein the USB-C connector pins further include pins designated for DisplayPort signaling.

3. The USB interface as recited in claim 1 wherein the USB connector pins are configured to provide four high-speed DisplayPort lanes and a USB-3 data channel.

4. The USB interface as recited in claim 1 wherein the pin controller is configured to repurpose the center connector pins employing a unique ID that indicates a different function for the center connector pins than originally assigned.

5. The USB interface as recited in claim 1 further comprising an alternate mode multiplexer, wherein the pin controller directs the alternate mode multiplexer to repurpose the center connector pins.

6. The USB interface as recited in claim 1 further comprising a USB data controller configured to coordinate communication of data for the data communication.

7. A method of repurposing pins of a USB-C connector, comprising:
negotiating signaling between a USB computing device and a USB connected device via USB-C connectors;
dynamically determining an alternate mode for repurposing center connector pins of the USB-C connectors that is supported by both the USB computing device and the USB connected device, wherein the center connector pins are four pins of the USB-C connectors that are originally designated for USB-2 signaling; and
activating the alternate mode for communication between the USB computing device and the USB connected device, wherein the alternate mode repurposes the four center connector pins originally designated for USB-2 signaling for USB-3 signaling.

8. The method as recited in claim 7 wherein the communication between the USB computing device and the USB connected device includes both DisplayPort signaling and the USB-3 signaling.

9. The method as recited in claim 8 wherein the USB connected device is a head-mounted display.

10. The method as recited in claim 7 wherein the dynamically determining includes using vendor-defined messages (VDM) through a configuration channel of the USB-C connectors.

11. The method as recited in claim 7 wherein the activating includes directing an alternate mode multiplexer to change a function of the center connector pins.

12. The method as recited in claim 7 further comprising receiving a first one of the USB-C connectors at the USB computing device and receiving a second one of the USB-C connectors at the USB connected device.

13. A computing device, comprising:
a processor; and
a Universal Serial Bus (USB) interface communicatively coupled to the processor, the USB interface including:
a USB-C connector having pins configured to communicate data between the processor and a connected device; and
a pin controller configured to repurpose four center connector pins of the USB-C connector pins originally designated for USB-2 signaling for USB-3 signaling.

14. The computing device as recited in claim 13 wherein the USB-C connector is configured to communicate the data using both USB-3 signaling and DisplayPort signaling.

15. The computing device as recited in claim 13 wherein the connected device is a display.

16. The computing device as recited in claim 13 wherein the pin controller is configured to repurpose the four center connector pins using vendor-defined messages (VDM) through a configuration channel of the USB-C connector employing a unique ID that indicates a different function for the four center connector pins.

17. The computing device as recited in claim 13 further comprising a USB data controller configured to coordinate communication of the data via the USB-C connector and an alternate mode multiplexer, wherein the pin controller directs the alternate mode multiplexer to repurpose the four center connector pins.

18. The computing device as recited in claim 14 wherein the connected device is a head-mounted display and the USB-3 signaling and the DisplayPort signaling provide four high-speed DisplayPort lanes and a USB-3 data channel.

* * * * *